(12) United States Patent
Kluge

(10) Patent No.: US 10,231,299 B2
(45) Date of Patent: Mar. 12, 2019

(54) SECURE ELEMENT HAVING A LIGHT EMITTING DIODE

(71) Applicant: GIESECKE & DEVRIENT GMBH, München (DE)

(72) Inventor: Stefan Kluge, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 78 days.

(21) Appl. No.: 15/519,304

(22) PCT Filed: Oct. 9, 2015

(86) PCT No.: PCT/EP2015/002010
§ 371 (c)(1),
(2) Date: Apr. 14, 2017

(87) PCT Pub. No.: WO2016/058687
PCT Pub. Date: Apr. 21, 2016

(65) Prior Publication Data
US 2017/0231043 A1    Aug. 10, 2017

(30) Foreign Application Priority Data

Oct. 16, 2014  (DE) .................. 10 2014 015 283
Sep. 28, 2015  (DE) .................. 10 2015 012 617

(51) Int. Cl.
*H05B 33/08*    (2006.01)
(52) U.S. Cl.
CPC ....... *H05B 33/0827* (2013.01); *H05B 33/089* (2013.01)
(58) Field of Classification Search
CPC ........... G06K 19/0701; G06K 19/0704; G06K 19/0707; G06K 19/0712; G06K 19/0715;
(Continued)

(56) References Cited

U.S. PATENT DOCUMENTS 7,317,303 B1    1/2008  DeVilbiss
7,710,213 B2    5/2010  Berhorst et al.
(Continued)

FOREIGN PATENT DOCUMENTS

CN    203118021 U  *  8/2013
DE    102007004843 A1   8/2008
(Continued)

OTHER PUBLICATIONS

German Search Report for corresponding German Application No. 102014015283.9, dated Aug. 14, 2015.
(Continued)

*Primary Examiner* — Seokjin Kim
(74) *Attorney, Agent, or Firm* — Workman Nydegger

(57) ABSTRACT

A method is for limiting a voltage in the reverse direction of a light emitting diode is disposed on a secure element. The light emitting diode is electrically connected in parallel to a coil and to operating voltage connectors of an integrated circuit. The coil serves for supplying energy to the integrated circuit and to the light emitting diode because an electrical voltage is induced in the coil with an electromagnetic field produced by an external terminal, and for the contactless data transmission between the integrated circuit and the external terminal. The integrated circuit serves for processing data transmitted between the terminal and the integrated circuit. A shunt regulator regulates the operating voltage required for the operation of the integrated circuit to a value within an allowable range and limits the operating voltage, so a maximally permissible voltage in the reverse direction of the light emitting diode is not exceeded.

12 Claims, 4 Drawing Sheets

(58) Field of Classification Search
CPC .......... G06K 19/0716; G06K 19/0717; G06K 19/0723; G06K 19/07703; G06K 19/07749; G06K 2017/0045; G06K 2017/0051; G06K 7/0008; G11C 8/10; H03G 11/02; H04B 5/0018; H04B 5/0031; H04B 5/0037; H04B 5/0056; H04B 5/0062; H04B 5/0081; H04L 27/04; H04L 27/08
See application file for complete search history.

(56) References Cited

U.S. PATENT DOCUMENTS

| | | | | |
|---|---|---|---|---|
| 2003/0184163 A1* | 10/2003 | DeVilbiss | .......... | G06K 19/0701 307/151 |
| 2007/0046468 A1* | 3/2007 | Davis | ................ | G06K 19/0707 340/572.1 |
| 2007/0108297 A1 | 5/2007 | Bates | | |
| 2007/0194928 A1 | 8/2007 | Berhorst et al. | | |
| 2008/0180224 A1* | 7/2008 | Klapf | ................ | G06K 19/0723 340/10.4 |
| 2010/0052908 A1 | 3/2010 | Doan et al. | | |
| 2011/0147468 A1 | 6/2011 | Park et al. | | |
| 2013/0222119 A1* | 8/2013 | Tietke | ................. | G06K 7/0008 340/10.5 |

FOREIGN PATENT DOCUMENTS

| | | |
|---|---|---|
| EP | 2139109 A1 | 12/2009 |
| WO | 2007069211 A1 | 6/2007 |

OTHER PUBLICATIONS

German Search Report for corresponding German Application No. 102015012617.2, dated May 17, 2016.

International Search Report for corresponding International PCT Application No. PCT/EP2015/002010, dated Mar. 1, 2016.

* cited by examiner

SECURE ELEMENT HAVING A LIGHT EMITTING DIODE

BACKGROUND

The invention describes a secure element, such as e.g. a chip card, having a light emitting diode, abbreviated as LED. The secure element is adapted in particular for a contactless data transmission and for this purpose has a coil that serves for both energy and data transmission between a chip, such as a security controller, of the secure element and an external terminal, such as a contactless reading device.

As a rule, the maximally allowable voltage in the reverse direction of an LED is approximately 5 volt. If the LED is operated on a second coil of its own, said coil not being connected to a chip of the secure element, it must be ensured that the voltage made available by the second coil is limited in the reverse direction of the LED, so that the LED is not destroyed at an excessive voltage in the reverse direction. To avoid this, as a rule a second LED is connected in anti-parallel to the first LED. Anti-parallel means that the first and the second LED are electrically connected in parallel to each other, but the forward direction of each LED is different. A disadvantage of this solution is the higher current consumption by the second LED and the cost of the second LED.

SUMMARY

Starting from the state of the art, the object of the invention is to find a solution which avoids the described disadvantage.

To achieve the object, the invention discloses a method for limiting a voltage in the reverse direction of a light emitting diode which is disposed on a secure element,
- wherein the light emitting diode is electrically connected in parallel to a coil and to operating voltage connectors of an integrated circuit,
- wherein the coil serves both for supplying energy to the integrated circuit and the light emitting diode in that an electrical voltage is induced in the coil by means of an electromagnetic field that is produced by an external terminal, such as a card reading device or a mobile phone with NFC interface, and for contactless data transmission between the integrated circuit and the terminal,
- wherein the integrated circuit serves for processing data which are transmitted between the terminal and the integrated circuit,
- which is characterized in that
- a shunt regulator regulates the operating voltage required for the operation of the integrated circuit to a value within an allowable range and limits said operating voltage thereby, so that a maximally permissible voltage in the reverse direction of the light emitting diode is not exceeded.

It is advantageous that the shunt regulator can be used to fulfill two tasks at once, thus regulating the operating voltage of the chip and limiting the voltage in the reverse direction of the light emitting diode, so that a damage of the light emitting diode due to excessive voltage in the reverse direction is prevented.

An advantageous embodiment example is that the minimal operating voltage required for the operation of the integrated circuit is smaller than the voltage that drops in the forward direction at the diode. Thus it is ensured that there is always sufficient energy available for the operation of the integrated circuit. In other words: First, the integrated circuit starts its operation and the light emitting diode thereafter, when sufficient energy is made available by the coil, so that the light emitting diode does not take away energy required for the operation of the integrated circuit when only a weak electromagnetic field is available from the terminal, wherein the electromagnetic field becomes the weaker the further away from the terminal the secure element is disposed.

A further advantageous embodiment example is that at least one electronic component is connected in series to the light emitting diode, in order to increase the voltage drop at the current branch containing the light emitting diode.

It is thus ensured that the light emitting diode will only light up when the integrated circuit has sufficient energy for its operation. In addition, as electronic component different types of diodes can be employed, such as normal diodes, Zener diodes, light emitting diodes, Schottky diodes, etc., in order to achieve a sufficiently high voltage drop.

A further advantageous embodiment example is that in addition to a diode as electronic component, an ohmic resistor is connected in series to the light emitting diode for current limitation. Further, by the ohmic resistor, the current flowing through the light emitting diode current can be limited, and thus the brightness of the light emitting diode can be adjusted.

A further advantageous embodiment example is that a switching element is employed for switching the light emitting diode on or off. The switching element can be considered very generally as an ohmic resistor which is high-ohmic in the open state and low-ohmic in the closed state. Thus, the switch can also be realized by any other suitable circuit having the behavior described above.

A further advantageous embodiment example is that the switching element is either integrated in the integrated circuit or is present as a separate component.

A further advantageous embodiment example is that the switching element is activated by the integrated circuit or activates itself.

A further advantageous embodiment example is that the switching element activates itself through a time control.

A further advantageous embodiment example is that the switching element is employed for operating the light emitting diode in pulsed fashion. Thus, the brightness of the light emitting diode can be regulated dynamically also by the switching element in addition to the above-mentioned ohmic resistor which represents a static regulation.

A further advantageous embodiment example is that the shunt regulator is integrated in the integrated circuit or forms a unit that is separate from the integrated circuit.

A further advantageous embodiment example is that the shunt regulator is a voltage-dependent resistor, wherein said resistor is realized by an electronic component or an electronic circuit.

A further advantageous embodiment example is that a portable data carrier is employed as secure element, such as a chip card, credit card, personal identity card, SIM card, etc.

BRIEF DESCRIPTION OF THE DRAWINGS

In the following, embodiment examples of the invention will be described with reference to the accompanying figures.

DETAILED DESCRIPTION OF VARIOUS EMBODIMENTS

Figure 1:
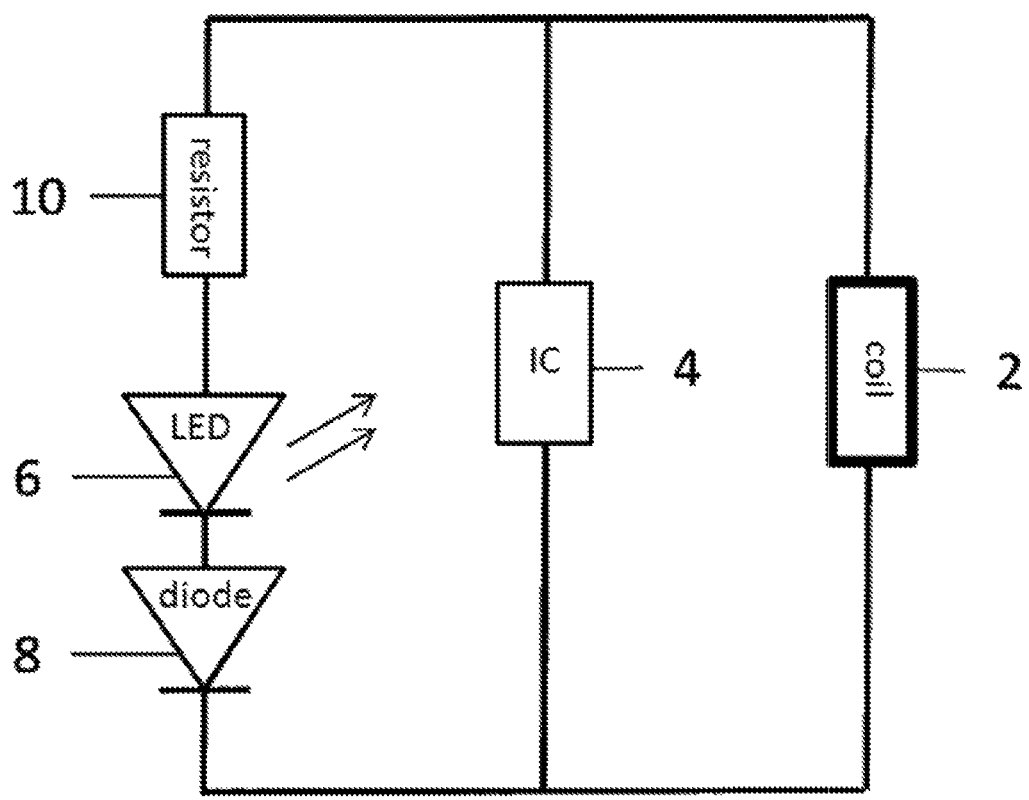
FIG. 1 shows a circuit according to the invention.

FIG. 1 shows the circuit according to the invention. The circuit consists of a parallel circuit of a coil 2 and an integrated circuit 4, for example an RFID chip, wherein the integrated circuit 4 is connected to the coil 2 via its operating voltage connectors. In the coil 2 a voltage is induced by an external electromagnetic field of a terminal. The induced voltage in the coil 2 serves for supplying energy to the circuit. Further, the coil 2 also serves for contactless data transmission between the integrated circuit 4 and the terminal not represented. In principle, also a contact-type interface can be present, however which is not represented for reasons of clarity. In parallel to the integrated circuit 4 a series connection is represented, which consists of a light emitting diode 6, a diode 8 and an ohmic resistor 10, wherein the diode 8 and the resistor 10 are optional components. The coil 2, the integrated circuit 4 and the light emitting diode 6 are substantial for the invention.

To avoid excessively high voltages in the reverse direction at the light emitting diode 6 which can lead to the destruction of the light emitting diode 6, according to the invention, a shunt regulator, which is not represented, but is usually contained in the integrated circuit 4, regulates the operating voltage of the integrated circuit 4 to a value so that trouble-free operation is possible and an excessively high voltage in the reverse direction of the light emitting diode 6 is prevented.

In a preferred embodiment, it is important that sufficient energy is present for the operation of the integrated circuit 4, and not for the operation of the light emitting diode 6. This means that when the circuit according to the invention is approached to a terminal with an electromagnetic field, sufficient energy will be made available first to the integrated circuit 4 to start its operation. Upon approaching the circuit according to the invention further to the terminal, in connection with an increase of the available energy and, ultimately, an increase in the voltage made available by the coil 2, in dependence on the conducting state voltage of the light emitting diode, sufficient electrical energy will be available starting at a certain distance from the terminal so that the light emitting diode lights up. The value of the conducting state voltage of the light emitting diode 6 therein depends on its emitted wavelength and/or luminous color and the material of the light emitting diode 6. It cannot occur therefore that the integrated circuit 4 cannot start its operation, in particular in a weak electromagnetic field, for example at a great distance to the terminal, since the energy is consumed by the light emitting diode 6. This can be achieved by a light emitting diode 6 with a conducting state voltage in the forward direction that is as high as possible.

The diode 8 serves for further increasing the voltage difference between the light emitting diode 6 and the integrated circuit 4 and to thus ensure that the integrated circuit 4 will be supplied with sufficient energy first for starting its operation, before the light emitting diode 6 begins to light up. The diode 8 can be a normal diode, a Zener diode, a light emitting diode or any other suitable diode, for example. Other components and circuits are possible as well which fulfill the same purpose as the diode 8. To the diode 8, further diodes can be connected in series as needed, which is not represented.

The ohmic resistor 10 serves for limiting current and thus to adjust the brightness of the light emitting diode 6 by limiting the flowing electrical current. The resistor 10 can have values of up to 1000 ohm, for example. As construction type, all suitable construction types are conceivable, for example as a discrete component of an SMD construction type or as a printed conductive path with distributed resistance.

The coil 2 in an advantageous embodiment consists of at least two individual coils, wherein a ferrite is arranged in at least one of the two coils. The two coils are laid out for the same resonance frequency. Therein, one of the coils can be employed to supply the integrated circuit 4 and the other coil can be used to supply a load. As a load, there come into question for example a heating coil for thermochromic inks for making information contained in the card visible, for example for personalization, or at least one light source, for example a LED, OLED, or other functional load.

The ferrite allows for the terminal to make respond or activate a coil with a lower response field strength than would be possible without the ferrite. Thus an optimization of the response field strength of at least one coil can take place in accordance with specifications or standards or a customer's requirements. For example, an RFID functionality must meet the relevant standards, wherein the LED 6 can be given lower priority. Thus the ferrite makes it possible that one single coil can be supplied with energy independently of the area of the respective coil enclosed in each case and independently of the other coil, wherein at the same time the response field strength of the respective coil is reduced and/or the terminal can work with a lower field strength in order to supply the respective coil with energy for the operation of the integrated circuit 4 or of a functional load.

The coils can be arranged so that they are arranged on one common or on different levels of the card. The coils can be arranged as partially or fully overlapping coils, coils arranged side by side or coils arranged within one another.

The two coils can have the same or a different size. This means that one coil encloses the entire surface of the card, for example a so-called full-size coil, or one coil encloses only a part of the entire surface of the card, such as a so-called half-size coil.

The coils can be formed of one or multiple layers. For example one of the coils can have one layer and the other one can have two layers. In a multi-layer coil, for example an insulating layer is arranged between the windings of the coil.

When more than one coil is used, it is not absolutely required for the coils to be arranged on the same side of a substrate, for example an inner foil layer of a card, or on the same substrate, but they can be arranged on different sides of the substrate or on different substrates.

The two coils have at least one winding each, wherein the two coils can have an equal or a different number of windings.

The ferrite can be arranged within a coil as a foil or by means of a printing process or in a different suitable manner. Through the arrangement of a ferrite in at least one of the two coils, the coil within which the ferrite is arranged is supplied with energy preferentially, since the ferrite quasi collects the field lines.

By varying the geometry and the electromagnetic properties, for example the choice of material or the processing parameters of the ferrite, such as when printing, it is also possible to adjust the resonance frequency and other electrical properties of the respective coil. Therein, the ferrite can be smaller than the respective coil within which the ferrite is arranged, of similar size or also larger than the associated coil.

The arrangement of the ferrite in the card is independent of the position of the coils in principle. The ferrite can be arranged on the same substrate surface as one of the coils or can be arranged on a back side of the substrate or also on a different foil layer within the card. Further, the ferrite can also be applied to the outside of the card. The advantageous effect of the ferrite is that the ferrite influences the ratio of the inductances of the two coils, so that a response field strength of a coil within which the ferrite is arranged is reduced and thus improved.

As a further advantageous embodiment example, it is expedient to combine the LED 6 with optical glitter bodies. When employed in chip cards, introduced optical glitters bodies, such as reflective metal or glimmer particles, for example pigments preferably in the form of small flakes, can result in an optically visible image by the flakes having the effect of a bright lighting up with a so-called glitter effect, i.e. a punctual optical reflection instead of an areal, optical scattering.

By employing the LED 6 as a point light source inside the card in connection with the glitter bodies there will result brightly lighting up points. Daylight or artificial light each represent a diffuse optical light source which produces only diffuse optical reflections with a very low optical intensity. This results in a significantly different picture through active illumination of the card by means of the LED 6 in comparison to a diffuse optical light source, such as represented by the daylight, for example. Thus, the combination consisting of the LED 6 in the card and glitter bodies is suitable as a security feature.

As a further embodiment of the invention, to a transparent card material can with reflective metal or glitter particles also a fluorescent dye can be added for converting light of the built-in LED 6 to a light with a longer wavelength, which can be recognized by a viewer from the outside.

In a further embodiment, the optical glitter bodies or scattering bodies have a different refractive index than the surrounding card material in order to obtain optical effects, such as reflection, refraction or scattering. The optical glitter bodies or scattering bodies can be employed as a security feature, for example as a security strip, or as an optically noticeable effect.

The optical glitter bodies can be applied to at least one foil before a final step for manufacturing the card, for example by means of lamination, wherein said foil is arranged for example on the inside of the card after the manufacture of the card. The optical glitter bodies can be applied on the foil over the full surface by means of a coating or only over part of the surface, for example by means of a printing process.

As another embodiment example, the optical glitter bodies can be integrated for example in a material of a foil, for example by addition of the optical glitter bodies into an extruder for manufacturing the foil. The foil with the integrated optical glitter bodies can later be arranged in the card over the full surface or in the form of strips of foil with the integrated optical glitter bodies in any desired orientation, wherein the preferred orientation is in the longitudinal or transverse direction.

As optical glitter bodies further the following materials can be used, such as chopped glass fibers, so-called microfiber, spheres of glass or plastic which are solid or hollow. In particular hollow spheres have a strong optical effect through the trapped air. The smaller the sphere diameter is, the higher is the stability, wherein the optical effect is improved with a larger diameter. For example, the diameter of the spheres is in the range of 1 to 200 µm.

Generally, the material introduced in the form of optical glitter bodies can also be colored, i.e. either it is colored only on the surface or the material as a whole is colored. Possible further exemplary variants are that the material has one or multiple colors and/or is transparent and at the same time UV-fluorescent.

For the case that hollow spheres are employed, said hollow spheres can also be filled with a magnetic ink, such as e-ink. The filling of the sphere can consist of a colored liquid and contain electrically charged or magnetic nanoparticles of a different color. Thus, a security feature is obtained that can be switched externally or internally.

In the finished card the introduced materials in the form of optical glitters bodies can be recognizable to a viewer. The optical glitter bodies can be recognizable from one or both sides of the card when the glitters bodies are arranged in unprinted regions of the card and light shines through the card from a back side of the card. Further, the materials introduced in the form of glitter bodies can be recognizable in the finished card in a printed area when light from a light source shines through under the printed surface.

This is for example the case when the LED 6 is arranged below a printed card surface. Alternatively, the introduced glitter bodies are recognizable on the front side or back side of the card. As a further alternative, the optical glitter bodies are recognizable on an edge of the card, when for example light is coupled from the outside into a light guide of the card and the light is transmitted via the light guide to a different side and coupled out again there.

In a finished card the introduced materials in the form of optical glitters bodies can thus be visible upon viewing in transmitted light, upon viewing in incident light, by activation of a light source present in the card body, for example the LED 6, or by light present in the card body which is coupled into or passed on to transparent layers or regions for example, wherein the light is passed on by means of areal or strip-shaped light guides for example.

As light guide strip foils can be used. The strip foils here can have one or multiple layers. Further, identical strip foils can be laid in the card in parallel or at an angle, for example in crossed fashion. Furthermore, strip foils can be laid which both contain optical glitter bodies and do not contain optical glitter bodies. Here, the strip foils which contain optical glitter bodies are at least partially transparent, wherein the strip foils without optical glitter bodies are opaque or transparent. Further, there is the possibility that a viewing window is formed on the card surface in the region where the strip foils intersect. Alternatively, a viewing window can also be formed in the edge region.

Figure 2:
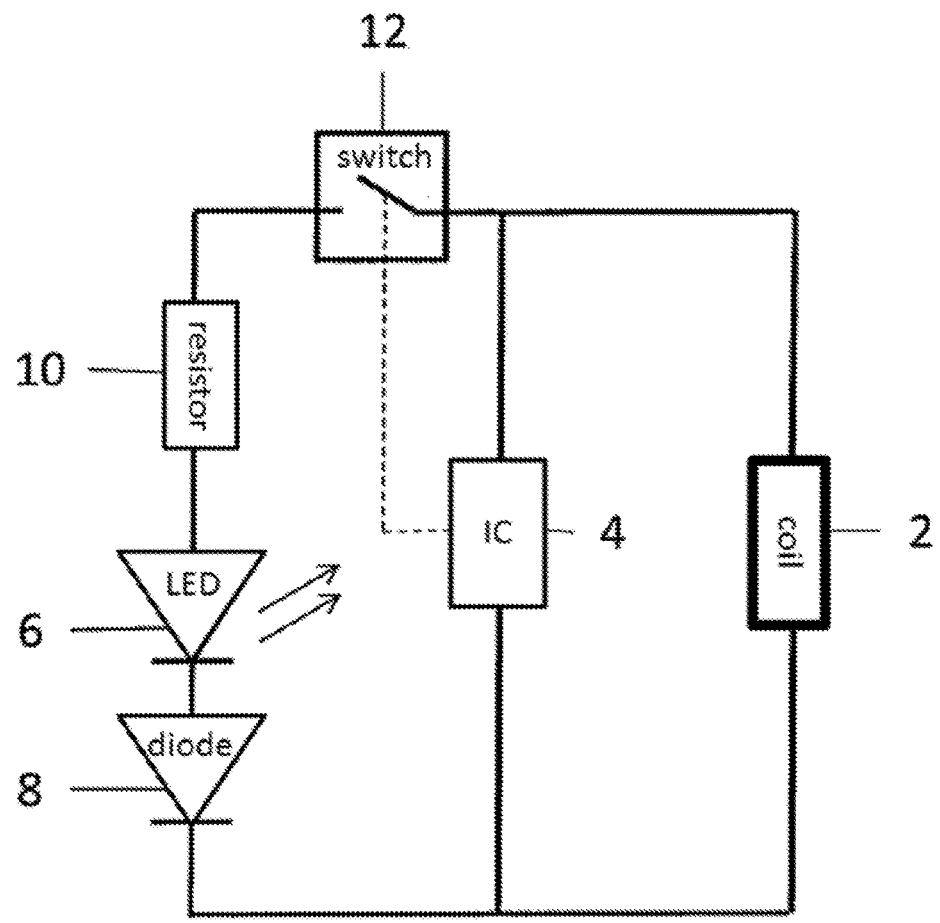
FIG. 2 shows the circuit according to the invention complemented by a switch which is actuated by the integrated circuit.

FIG. 2 shows the circuit according to the invention complemented by a switch 12 which is actuated by the integrated circuit 4. The switch 12 is shown here as a separate component that is actuated or activated by a signal of the integrated circuit 4. The switch 12 is for example actuated by the integrated circuit 4, as soon as the integrated circuit 4 has started its operation and sufficient energy is available to operate also the light emitting diode or to have the light diode 6 indicate a result of a processing, for example.

Figure 3:
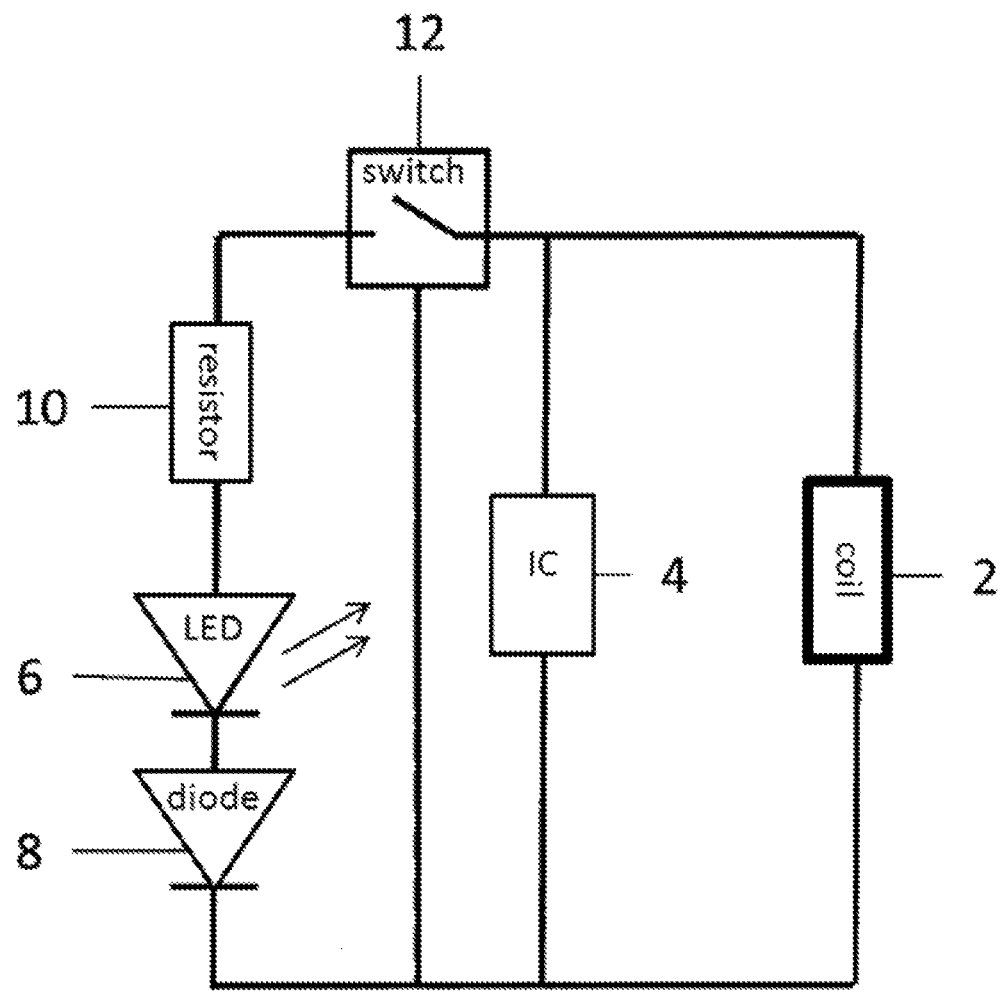
FIG. 3 shows the circuit according to the invention complemented by a switch which switches in time-controlled fashion, independently of the integrated circuit.

FIG. 3 shows the circuit according to the invention complemented by a switch 12 which switches independently of the integrated circuit 4, for example in time-controlled fashion.

Figure 4:
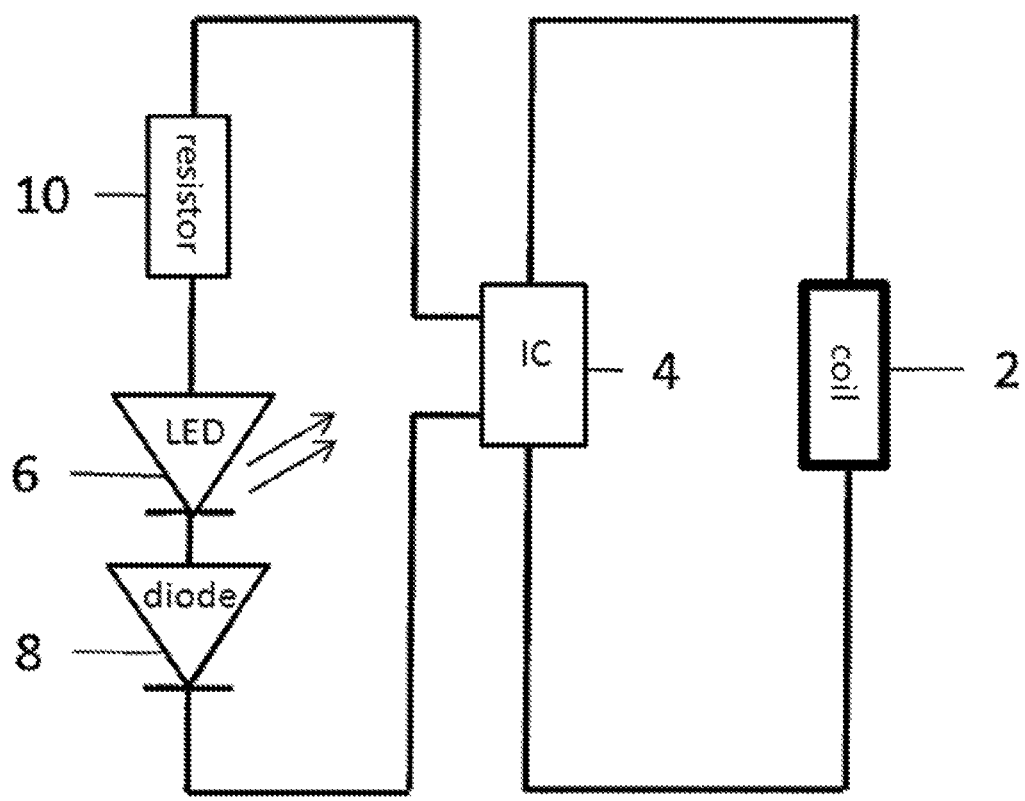
FIG. 4 shows the circuit according to the invention, wherein a switch is contained in the integrated circuit.

FIG. 4 shows the circuit according to the invention, wherein a switch 12 is contained in the integrated circuit 4.

There are now different application cases for the circuit according to the invention with a switch 12.

In the case of an automatic transaction confirmation the entire energy received in contactless fashion is first employed for the integrated circuit 4, e.g. an RFID chip, to carry out a transaction. Since the total energy received in contactless fashion is supplied to the integrated circuit 4, the distance between the circuit according to the invention and a terminal can be maximized.

After completion of the transaction, the light emitting diode 6 is activated via the switch 12 and the completed transaction is thus indicated. Therein the switch 12 can either be actuated directly by the integrated circuit 4 or independently of the integrated circuit 4, after the expiration of a certain time that is permitted as the maximal transaction time by relevant standards, for example.

In a different application case, a lighting up of the light emitting diode 6 signals that the circuit according to the invention, which is arranged on a secure element, e.g. a credit card, is disposed in an electromagnetic field of a terminal. Upon actuation of a switch 12 disposed in the secure element and actuated by a user, the integrated circuit 4 receives the energy required to execute a transaction. During the execution of the transaction, the light emitting diode 6 is turned off by the integrated circuit 4, so that it is ensured that the integrated circuit 4 and the light emitting diode 6 do not have to share the available energy.

Here, the light emitting diode 6 is an example for all other possible types of a load, such as an electroluminescent display or a heating resistor.

In a particular application, the switch 12 can be used to operate the light emitting diode 6 in pulsed fashion. This is possible when the current-limiting resistor 10 is chosen correspondingly low and the light emitting diode 6 is operated in pulsed fashion by opening and closing the switch 12 at a high frequency. The human eye then perceives the light from the light emitting diode 6 to be brighter than perceived in non-pulsed operation at the same energy consumption. By the pulsed operation of the light emitting diode 6 it is thus possible either to save energy at the same brightness of the light emitting diode 6 perceived by the human eye, in which case more energy is available to the integrated circuit, or the brightness of the light emitting diode 6 perceived by the human eye can be increased at the same energy consumption.

Further, by suitably adapting the time length of pulse duration and pulse pause despite different distance from the terminal and related different electromagnetic field strength, the brightness of the light emitting diode 6 can be regulated so that the brightness will always be perceived as equally bright by the human eye in a certain distance range of the card from the terminal.

LIST OF REFERENCE NUMBERS

2 coil
4 integrated circuit, e.g. an RFID chip
6 light emitting diode
8 diode
10 ohmic resistor
12 switching element

The invention claimed is:

1. A method for limiting a voltage in the reverse direction of a light emitting diode of a secure element, the method comprising the steps of:
   providing a secure element, the light emitting diode being dispose on the secure element,
   wherein the light emitting diode is electrically connected in parallel to a coil and to operating voltage connectors of an integrated circuit,
   wherein the coil serves both for supplying energy to the integrated circuit and the light emitting diode in that an electrical voltage is induced in the coil by means of an electromagnetic field produced by an external terminal, and for contactless data transmission between the integrated circuit and the terminal,
   wherein the integrated circuit serves for processing data which are transmitted between the terminal and the integrated circuit; and
   regulating with a shunt regulator the operating voltage required for the operation of the integrated circuit to a value within an allowable range; and
   limiting with the shunt regulator said operating voltage such that a maximally permissible voltage in the reverse direction of the light emitting diode is not exceeded,
   wherein the shunt regulator is configured to perform at once both the regulating step and the limiting step.

2. The method according to claim 1, wherein a minimal operating voltage required for the operation of the integrated circuit is smaller than the voltage that drops in the forward direction at the light emitting diode.

3. The method according to claim 1, wherein to the light emitting diode at least one electronic component is connected in series in order to increase a voltage drop at the current branch containing the light emitting diode.

4. The method according to claim 3, wherein in addition to the electronic component an ohmic resistor is connected in series for the current limitation of the light emitting diode.

5. The method according to claim 1, wherein a switching element is employed to switch the light emitting diode on or off.

6. The method according to claim 5, wherein the switching element is either integrated in the integrated circuit or is present as a separate component.

7. The method according to claim 5, wherein the switching element is activated by the integrated circuit or activates itself.

8. The method according to claim 5, wherein the switching element activates itself through a time control.

9. The method according to claim 1, wherein the switching element is employed to operate the light emitting diode in pulsed fashion.

10. The method according to claim 1, wherein the shunt regulator is integrated in the integrated circuit or forms a unit that is separate from the integrated circuit.

11. The method according to claim 1, wherein the shunt regulator is a voltage-dependent resistor.

12. The method according to claim 1, wherein a portable data carrier is employed as a secure element.

* * * * *